United States Patent [19]
Kaylor

[11] Patent Number: 4,659,436
[45] Date of Patent: Apr. 21, 1987

[54] PARTICULATE DIAMOND-COATED METAL ARTICLE WITH HIGH RESISTANCE TO STRESS CRACKING AND PROCESS THEREFOR

[75] Inventor: Marvin A. Kaylor, San Leandro, Calif.

[73] Assignee: Augustus Worx, Inc., San Leandro, Calif.

[21] Appl. No.: 832,825

[22] Filed: Feb. 24, 1986

[51] Int. Cl.⁴ ............................................. C25D 15/00
[52] U.S. Cl. ..................................................... 204/16
[58] Field of Search .......................................... 204/16

[56] References Cited

U.S. PATENT DOCUMENTS

| | | | |
|---|---|---|---|
| 2,650,886 | 9/1953 | Zelley | 204/33 |
| 2,784,536 | 3/1957 | Barron | 204/16 |
| 2,924,050 | 2/1960 | Barron | 51/405 |
| 3,762,882 | 10/1973 | Grutza | 204/16 |
| 3,936,577 | 2/1976 | Christini et al. | 428/426 |
| 4,290,859 | 9/1981 | Oda | 204/16 |

FOREIGN PATENT DOCUMENTS 54-21926  2/1979  Japan .............................. 427/443.1

Primary Examiner—T. M. Tufariello
Attorney, Agent, or Firm—Manfred M. Warren; Robert B. Chickering; Glen R. Grunewald

[57] ABSTRACT

A metallic substrate which is to be electroplated with a metal other than copper for use in high stress applications, such as band saw blades, is given improved resistance to stress fracture by electroplating with copper from an alkaline solution prior to the noncuprous metal.

17 Claims, No Drawings

PARTICULATE DIAMOND-COATED METAL ARTICLE WITH HIGH RESISTANCE TO STRESS CRACKING AND PROCESS THEREFOR

BACKGROUND OF THE INVENTION

This invention relates to the electroplating of metallic substrates, and particularly to the manufacture of composite metallic articles such as coated band saw blades which encounter a high incidence of stress cracking during prolonged use.

Continuous band saw blades are commonly used for high precision cutting of tough materials such as marble, quartz, and metals. The blades generally consist of a hard basis metal, such as carbon steel or stainless steel, with an abrasive edge coating, generally a grit embedded in a metallic plating layer. In use, the blades run at a lineal velocity exceeding 3000 surface feet per minute and are maintained under high tension with loads as high as 30,000 pounds per square inch.

The life of a typical blade is generally determined by the ability of the basis metal to withstand the stress, since blade breakage due to stress cracking occurs much sooner than by any loss of abrasive quality of the cutting edge. Since one of the most effective abrasive materials is particulate diamond, an expensive material, there is much to be gained by prolongation of the life of the substrate basis material.

SUMMARY OF THE INVENTION

It has now been discovered that a metallic substrate with a coating applied by electroplating can be given substantially increased resistance to stress cracking by applying a layer of copper in between the substrate and the outer electroplated layer, when the copper is applied by electroplating from an alkaline solution. The invention thus resides in a process for preparing the coated article comprising first electroplating the substrate with copper from an alkaline solution, followed by electroplating with the final metallic layer; as well as in an article of manufacture comprising the metallic substrate with an intermediate copper layer having been applied by electroplating from an alkaline solution, and an outer metallic layer applied by electroplating. Due to its highly increased resistance to cracking under prolonged high stress conditions, the product of the present invention is particularly useful in the preparation of high tension cutting tools, such as band saw blades where the outer electroplated metallic layer contains particulate abrasive material embedded therein.

DESCRIPTION OF THE PREFERRED EMBODIMENTS

In accordance with the present invention, the copper electroplating is applied directly to the surface of the metallic substrate prior to the deposition of the final metallic coating. The copper electroplating may be done according to the conventional techniques using alkaline copper electroplating baths. The procedure may be a single step procedure or a multistep procedure. It is preferred, however, that the procedure at least begin with the use of an alkaline electroplating bath having a low cathode efficiency and high throwing power. Electroplating baths commonly known as "strike" baths may be used for this purpose. Examples are plain copper cyanide baths or Rochelle salt-containing copper cyanide baths, which include an alkali metal cyanide in addition to the copper cyanide to the extent that at least about 15 percent, and preferably at least about 25 percent of the alkali metal cyanide is free alkali metal cyanide.

The term "free alkali metal cyanide" is used herein to denote the amount of alkali metal cyanide in excess of that which is stoichiometrically required to form a complex with the copper (i.e., cuprous) cyanide. In general, the complex is formed from 2 moles of the alkali metal cyanide per mole of copper cyanide. The term "alkali metal" refers to group I-A of the Periodic Table. Sodium and potassium are preferred.

The strike bath is further characterized by operation at a low cathode efficiency, i.e. the percent of the current at the cathode which is used in the deposition of the metal rather than the evolution of hydrogen gas. In preferred applications of the present invention, the cathode efficiency in this initial part of the copper plating procedure is less than about 50 percent, with less than about 30 percent particularly preferred.

The strike bath is an alkaline solution of the salt, generally at a pH of at least about 8.0, preferably at least about 10.0, and most preferably from about 11.0 to about 13.0. The desired pH may be achieved in any conventional manner, preferably by the inclusion in appropriate amounts of the carbonate or hydroxide of the same alkaline metal included as the alkaline metal cyanide.

In particularly preferred cases, the strike bath is used to form a preliminary layer of copper over the substrate. Additional copper is then plated over the preliminary layer from a higher efficiency copper electroplating bath. Notable examples are high efficiency copper cyanide (having a lower proportion of free cyanide) and copper pyrophosphate baths. Like the strike baths, these baths are well known in the art.

Such baths are generally selected and operated at a cathode efficient of about at least 75 percent, preferably at least about 95 percent.

The thickness of the copper layer, whether it be from a single-step or a multiple-step procedure, is not critical and can vary over a wide range. In general, however, layers at least about 0.1 mil ($2.5 \times 10^{-4}$ cm) in thickness will provide the best results. Preferred thicknesses range from about 0.2 mil ($5.1 \times 10^{-4}$ cm) to about 1.0 mil ($2.5 \times 10^{-3}$ cm), with about 0.3 mil ($7.6 \times 10^{-4}$ cm) to about 0.5 mil ($1.27 \times 10^{-3}$ cm) particularly preferred.

The final metallic layer containing the abrasive particles is applied by conventional techniques. The metal in this layer is any metal other than copper. A preferred metal is nickel, which can be applied by any of the conventional nickel electroplating baths. A notable example is the Watts bath, containing nickel sulphate, nickel chloride and boric acid as its primary constituents. Particularly favorable results may be achieved by use of a rectifier of the pulse plater type for the electroplating, in order to increase the throwing power and decrease the plating time. Overall plating thickness wil be reduced in comparison with conventional d.c. plating.

Optional further treatments or steps may be included in the overall procedure as desired, for purposes of cleaning and lowering of the risk of hydrogen embrittlement. These are all done in accordance with conventional procedures. The various possibilities, which may be used either alone or in combination, include degreasing, deburring, cathodic and anodic electrocleaning, and baking (for stress and hydrogen relief). Degreasing is preferably achieved by using the vapor of a chlorinated solvent. Examples of such solvents include trichloroethylene, 1,1,1-trichloroethane, perchloroethylene and methylene chloride. Deburring is readily accomplished by such procedures as tumbling, abrasive blasting, and wire brushing. Cathodic electrocleaning is generally done with the use of an alkaline cleaning solution with a low voltage current (generally 3–12 volts) at current densities of 10–150 amp/ft$^2$. Baking is generally done at a temperature ranging from about 300° F. to about 500° F. (150°–260° C.) for about 1–5 hours. This is preferably done after each electroplating step, including the final deposition of the abrasive-containing layer.

The substrate metal may be any metal which can be electroplated and which is subject to stress cracking. As noted above, the invention is of particular utility when applied to blade materials, such as iron alloys, notably carbon steel and stainless steel.

The following examples are offered for purposes of illustration, and are intended neither to define nor limit the invention in any manner.

EXAMPLE 1

A continuous band saw of high carbon steel, measuring 0.035 inch (0.09 cm) in thickness, 1.0 inch (2.5 cm) in width and 17 feet 8 inches (583.5 cm) in length was cleaned and coated as follows:

Oil was removed by 1,1,1-trichloroethane vapor; and the surface was finished by abrasive blasting using aluminum oxide particles, then anodically electrocleaned using an alkaline detergent solution containing sodium hydroxide. The cleaned surface was then rinsed in cold distilled water and immersed in a copper cyanide strike bath having the following composition:

| CuCN | 5.6 oz/gal | (41.9 g/L) |
|---|---|---|
| NaCN | 7.8 oz/gal | (58.4 g/L) |
| Na$_2$CO$_3$ | 3.5 oz/gal | (26.2 g/L) | at a temperature of about 90° F. (72° C.) and a cathode current density of 30 amp/ft$^2$ for 60 seconds. The metal was then rinsed again in cold distilled water, heated to 400° F. (204° C.) for two hours, and then rinsed a third time. Copper plating was then continued in a pyrophosphate bath of the following composition:

| CuP$_2$O$_7$ | 9.0 oz/gal | (67.4 g/L) |
|---|---|---|
| K$_4$P$_2$O$_7$ | 38.0 oz/gal | (285 g/L) |
| KNO$_3$ | 4.8 oz/gal | (35.6 g/L) |
| NH$_3$ | 9.2 oz/gal | (68.9 g/L) | at a temperature of about 125° F. (52° C.) and a cathode current density of 40 amp/ft$^2$ for 3 minutes to a final copper thickness of approximately 0.4 mil (0.003 cm). This was followed by a fourth cold distilled water rinse. The blade was then masked except for its cutting edge, which was then embedded in diamond grit of 40–50 mesh. The grit was then secured to the unmasked surface by electroplating with a nickel matrix Watts solution of the following composition:

| NiSO$_4$.6H$_2$O | 43.0 oz/gal | (322 g/L) |
|---|---|---|
| NiCl$_2$.6H$_2$O | 6.5 oz/gal | (48.7 g/L) |
| H$_3$BO$_3$ | 5.0 oz/gal | (37.5 g/L) |

The electroplating was done at a temperature of 140° F. (60° C.) and a current density of 50 amp/ft$^2$ for 6.5 hours. This was followed by a final water rinse and heating to 400° F. (204° C.) for 12 hours.

The finished blade was placed on a band saw with thirty-inch (76-cm) wheels. The saw was equipped with a timer which showed accumulated time during which the saw was in actual operation, and was used in cutting quartz crystal ranging in thickness from 6 to 28 inches (15–70 cm).

After 263 hours of use, the blade broke. Microscopic examination of the blade under infrared light in a magnetic field after treatment with a flux solution revealed no cracks in the basis material. The blade was then rewelded and put back in use for another 154 hours of cutting time, at which time it broke again. Microscopic examination again revealed no cracks in the basis material.

EXAMPLE 2

For comparison, a blade of dimensions and basis material identical to those of the blade in Example 1 was cleaned and plated in the identical manner with the deletion, however of the two copper plating steps and the intermediate heating and rinse.

The resulting coated blade was tested on the same band saw. At approximately 120 hours of cutting time, the blade broke, and microscopic analysis of the basis material revealed an average of 6 fractures per lineal inch (2.4 per lineal centimeter).

The above description and examples are offered primarily for purposes of illustration. Numerous modifications and variations, which although not specifically mentioned still fall within the spirit and scope of the invention, will be readily apparent to those skilled in the art.

What is claimed is:

1. In a method for depositing a particulate abrasive on a metallic substrate by electroplating thereon a metal other than copper with said particulate abrasive dispersed therein, the improvement comprising electroplating said metallic substrate with copper from an alkaline solution containing copper ions prior to depositing said particulate abrasive.

2. A method according to claim 1 in which said electroplating with copper is begun by electrolytically precipitating copper onto said metallic substrate from a first alkaline electroplating bath containing copper cyanide and an alkali metal cyanide in which at least about 15% of said alkali metal cyanide is free alkali metal cyanide, at a cathode efficiency of less than about 50%.

3. A method according to claim 1 in which said electroplating with copper is begun by electrolytically precipitating copper onto said metallic substrate from a first alkaline electroplating bath containing copper cyanide and an alkali metal cyanide in which at least about 25% of said alkali metal cyanide is free alkali metal cyanide, at a cathode efficiency of less than about 30%.

4. A method according to claim 1 in which said electroplating with copper is comprised of:
 (a) electrolytically depositing a preliminary layer of copper onto said metallic substrate from a first alkaline plating bath containing copper cyanide and an alkali metal cyanide in which at least about 15% of said alkali metal cyanide is free alkali metal cyanide, at a cathode efficiency of less than about 50%; and electrolytically depositing a further layer of copper over said preliminary layer from a second alkaline plating bath at a cathode efficiency of at least about 75%.

5. A method according to claim 1 in which said electroplating with copper is comprised of:
   (a) electrolytically depositing a preliminary layer of copper onto said metallic substrate from a first alkaline plating bath containing copper cyanide and an alkali metal cyanide in which at least about 25% of said alkali metal cyanide is free alkali metal cyanide, at a cathode efficiency of less than about 30%; and
   (b) electrolytically depositing a further layer of copper over said preliminary layer from a second alkaline plating bath at a cathode efficiency of at least about 95%.

6. A method according to claims 4 or 5 further comprising heating said substrate to a temperature of about 300° F. to about 500° F. for about 1 to about 5 hours between steps (a) and (b).

7. A method according to claim 1 in which the copper layer produced by said electroplating with copper is at least about 0.1 mil in thickness.

8. A method according to claim 1 in which the copper layer produced by said electroplating with copper is about 0.2 mil to about 1.0 mil in thickness.

9. A method according to claim 1 in which the copper layer produced by said electroplating with copper is about 0.3 mil to about 0.5 mil in thickness.

10. A method according to claim 1 further comprising anodically electrocleaning said metallic substrate with an alkaline solution prior to said electroplating with copper.

11. A method for depositing particulate diamond on a metallic substrate, comprising:
    (a) descaling said substrate in an alkaline solution;
    (b) electrolytically depositing a preliminary layer of copper onto said metallic substrate from a first alkaline plating bath containing copper cyanide and an alkali metal cyanide in which at least about 25% of said alkali metal cyanide is free alkali metal cyanide, at a cathode efficiency of less than about 30%;
    (c) heating said metallic substrate with said preliminary layer deposited thereon to a temperature of about 300° F. to about 500° F. for about 1 to about 5 hours;
    (d) electrolytically depositing further copper over said preliminary layer from a second alkaline plating bath containing copper ions at a cathode efficiency of at least about 95%, to thicken said preliminary layer to a total thickness of about 0.2 mil to about 1.0 mil;
    (e) electrolytically depositing a layer of metal other than copper incorporating diamond particles over said thickened layer.

12. A method according to claim 10 in which said metal other than copper is nickel.

13. A composite metal article comprising:
    a metallic substrate;
    an intermediate layer of copper applied by electroplating from an alkaline solution containing copper ions; and
    an outer layer of a metal other than copper applied by electroplating.

14. A composite metal article according to claim 13 in which said metal other than copper is nickel.

15. A composite metal article according to claim 13 in which said intermediate layer of copper is at least about 0.1 mil in thickness.

16. A composite metal article according to claim 13 in which said intermediate layer of copper is about 0.2 mil to about 1.0 mil in thickness, and said outer layer of metal contains abrasive particles dispersed therein.

17. A composite metal article according to claim 13 in which said intermediate layer of copper is about 0.3 mil to about 0.5 mil in thickness, and said outer layer of metal is nickel with abrasive particles dispersed therein.

* * * * *